US012215606B2

(12) United States Patent
Liles

(10) Patent No.: US 12,215,606 B2
(45) Date of Patent: Feb. 4, 2025

(54) TURBINE ENGINE WITH TOBI SUPPORTING VANES

(71) Applicant: RAYTHEON TECHNOLOGIES CORPORATION, Farmington, CT (US)

(72) Inventor: Howard J. Liles, Newington, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/302,976

(22) Filed: Apr. 19, 2023

(65) Prior Publication Data

US 2023/0383663 A1 Nov. 30, 2023

Related U.S. Application Data

(60) Provisional application No. 63/346,401, filed on May 27, 2022.

(51) Int. Cl.
*F01D 9/04* (2006.01)
*F01D 5/08* (2006.01)
*F01D 9/06* (2006.01)

(52) U.S. Cl.
CPC ............. *F01D 9/041* (2013.01); *F01D 5/082* (2013.01); *F01D 9/065* (2013.01); *F05D 2240/12* (2013.01); *F05D 2260/20* (2013.01)

(58) Field of Classification Search
CPC .......... F01D 9/041; F01D 9/065; F01D 5/081; F01D 5/082; F01D 5/084; F01D 25/12; F01D 9/06; F05D 2240/12; F05D 2260/20
See application file for complete search history.

(56) References Cited

U.S. PATENT DOCUMENTS

| | | | |
|---|---|---|---|
| 4,435,123 | A | 3/1984 | Levine |
| 4,526,511 | A | 7/1985 | Levine |
| 5,320,483 | A | 6/1994 | Cunha et al. |

(Continued)

FOREIGN PATENT DOCUMENTS

| | | | |
|---|---|---|---|
| GB | 938247 A | * 3/1962 | |
| GB | 938247 | 10/1963 | |

OTHER PUBLICATIONS

European Search Report for European Patent Application No. 23176113.1 mailed Oct. 20, 2023.

*Primary Examiner* — Mark A Laurenzi
*Assistant Examiner* — Xiaoting Hu
(74) *Attorney, Agent, or Firm* — Carlson, Gaskey & Olds, P.C.

(57) ABSTRACT

A gas turbine engine includes a circumferential row of vanes arranged about a central engine axis. The vanes include respective internal cavities and vane outlet ports for conveying cooling air. A tangential onboard injector (TOBI) radially supports the vanes at an inner diameter of the circumferential row. The TOBI includes fore and aft annular walls and an outer diameter annular wall. The fore and aft annular walls and the outer diameter annular wall define an annular plenum. The outer diameter annular wall includes TOBI inlet ports that are connected, respectively, with the vane outlet ports to receive the cooling air from each of the vanes into the plenum. The TOBI includes axially-oriented nozzles for discharging the cooling air from the plenum in an aft direction.

10 Claims, 4 Drawing Sheets

(56) References Cited

U.S. PATENT DOCUMENTS

| | | | | |
|---|---|---|---|---|
| 5,645,397 | A * | 7/1997 | Soechting ............... | F01D 5/187 415/115 |
| 6,179,555 | B1 | 1/2001 | Tremaine | |
| 7,025,562 | B2 | 4/2006 | Imbourg et al. | |
| 8,240,980 | B1 | 8/2012 | Liang | |
| 9,291,071 | B2 | 3/2016 | Jewess | |
| 2006/0034685 | A1 * | 2/2006 | Kizuka ................. | F01D 11/001 415/191 |
| 2011/0189000 | A1 * | 8/2011 | Vedhagiri ................. | F02C 7/18 415/178 |
| 2014/0154059 | A1 * | 6/2014 | Jewess .................. | F01D 11/001 29/889.22 |
| 2016/0108748 | A1 * | 4/2016 | Harris ..................... | F01D 9/042 415/177 |
| 2016/0201688 | A1 * | 7/2016 | Lyons ..................... | F01D 5/081 60/751 |
| 2017/0107853 | A1 * | 4/2017 | Scoffone ................... | F01D 9/02 |
| 2017/0234218 | A1 | 8/2017 | Cupini et al. | |

* cited by examiner

TURBINE ENGINE WITH TOBI SUPPORTING VANES

CROSS-REFERENCE TO RELATED APPLICATION

The present application claims priority to U.S. Provisional Application No. 63/346,401 filed May 27, 2022.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic materials are also being considered for airfoils. Among other attractive properties, ceramic materials have high temperature resistance. Despite this attribute, however, there are unique challenges to implementing ceramic materials in airfoils.

SUMMARY

A gas turbine engine according to an example of the present disclosure includes a circumferential row of vanes arranged about a central engine axis. The vanes include respective internal cavities and vane outlet ports for conveying cooling air. A tangential onboard injector (TOBI) radially supports the vanes at an inner diameter of the circumferential row. The TOBI includes fore and aft annular walls and an outer diameter annular wall. The fore and aft annular walls and the outer diameter annular wall define there between an annular plenum. The outer diameter annular wall includes TOBI inlet ports that are connected, respectively, with the vane outlet ports to receive the cooling air from each of the vanes into the plenum. The TOBI includes a plurality of axially-oriented nozzles for discharging the cooling air from the plenum in an aft direction.

In a further embodiment of any of the foregoing embodiments, the outer diameter annular wall radially supports the vanes.

In a further embodiment of any of the foregoing embodiments, the outer diameter annular wall has an outer diameter surface that is in full interfacial contact with the vanes.

In a further embodiment of any of the foregoing embodiments, the vane outlet ports are radially aligned with, respectively, the TOBI inlet ports.

In a further embodiment of any of the foregoing embodiments, vane outlet ports and the TOBI inlet ports are circular in cross-section.

In a further embodiment of any of the foregoing embodiments, the vane outlet ports and the TOBI inlet ports include upstanding lips.

In a further embodiment of any of the foregoing embodiments, the vanes have, respectively, inner diameter platforms, the inner diameter platforms having radial tabs extending therefrom, the outer diameter annular wall of the TOBI includes a radially-open slot, and the radial tabs are disposed in the radially-open slot and limit relative axial movement between the TOBI and the vanes.

A further embodiment of any of the foregoing embodiments includes seals between the vanes and the outer diameter annular wall that seal around the vane outlet ports and the TOBI inlet ports.

In a further embodiment of any of the foregoing embodiments, the vanes are in a turbine section.

A tangential onboard injector (TOBI) is disposed about a central axis and including fore and aft annular walls and an outer diameter annular wall. The fore and aft annular walls and the outer diameter annular wall define there between an annular plenum. The outer diameter annular wall includes TOBI inlet ports for connecting, respectively, with vane outlet ports of turbine vanes to receive cooling air from the turbine vanes into the plenum. The TOBI includes a plurality of axially-oriented nozzles for discharging the cooling air from the plenum in an aft direction.

In a further embodiment of any of the foregoing embodiments, the TOBI inlet ports are circular in cross-section.

In a further embodiment of any of the foregoing embodiments, the TOBI inlet ports include upstanding lips.

In a further embodiment of any of the foregoing embodiments, the outer diameter annular wall is bonded to the fore and aft walls at weld joints.

In a further embodiment of any of the foregoing embodiments, the outer diameter annular wall includes a radially-open slot.

A further embodiment of any of the foregoing embodiments includes seals around the TOBI inlet ports.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
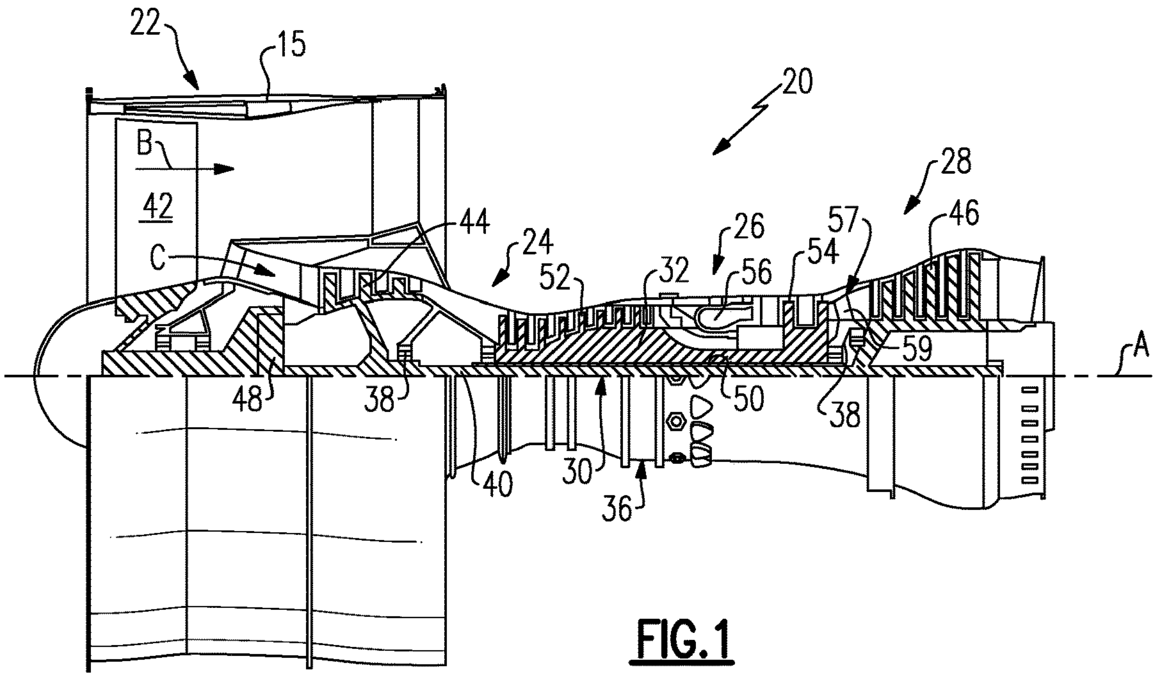
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram }°\text{R})/(518.7°\text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
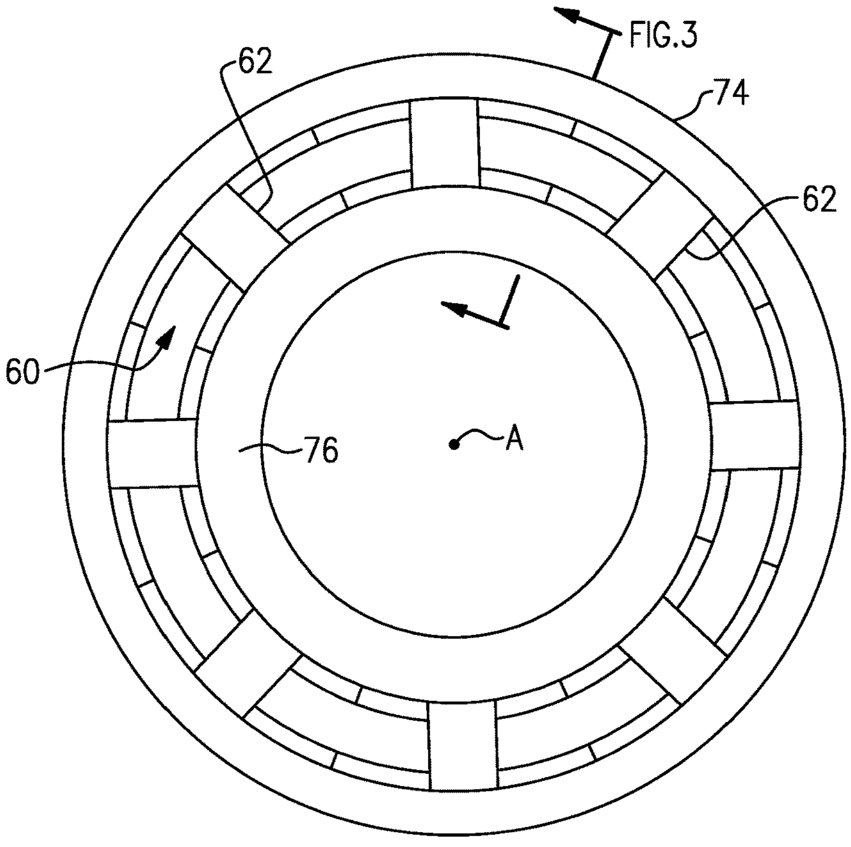
FIG. 2 illustrates a portion of the turbine section of the engine with a TOBI radially supporting turbine vanes.
Figure 3:
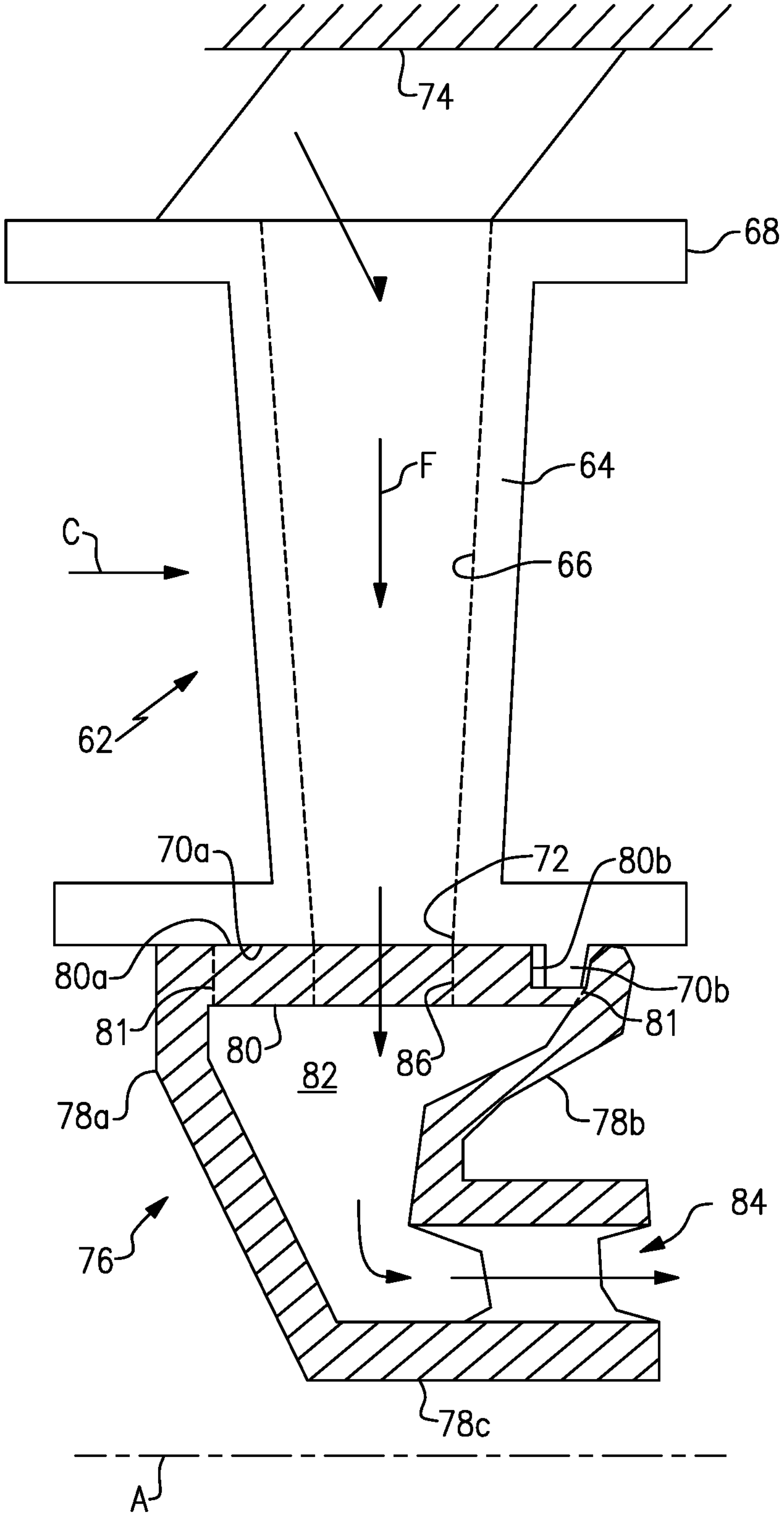
FIG. 3 illustrates a view of the TOBI and representative vane.

FIG. 2 illustrates an axial view of a portion of the turbine section 28 of the engine 20, and FIG. 3 illustrates a sectioned view from the circumferential direction. The turbine section 28 includes a circumferential row 60 of vanes 62 that are arranged about the engine central longitudinal axis A. Each vane 62 (FIG. 3) is comprised of an airfoil section 64 that has an internal through-cavity 66 and first (outer) and second (inner) platforms 68/70 between which the airfoil section 64 extends. The internal through cavities 66 lead to vane outlet ports 72 through the second platforms 70, for conveying cooling air flow F through the vanes 62, such as bleed air from the compressor section 24. The platforms 68/70 provide radially outer and inner bounds of the core gas path C. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The vanes 62 may be formed of a ceramic material. For example, the ceramic material may be a monolithic ceramic, a ceramic matrix composite ("CMC"), or configurations that include both monolithic ceramic and CMC. Example ceramic materials include silicon-containing ceramic, such as but not limited to, silicon carbide (SiC) and/or silicon nitride (Si3N4). A CMC is formed of ceramic fiber tows that are disposed in a ceramic matrix. As an example, the CMC may be, but is not limited to, a SiC/SiC composite in which SiC fiber tows are disposed within a SiC matrix. The fiber tows are arranged in a fiber architecture, which refers to an ordered arrangement of the tows relative to one another. A monolithic ceramic does not contain fibers or reinforcement and is formed of a single material. Although this disclosure is described in context of ceramic vanes, and the disclosed support scheme may be especially useful for ceramic vanes, it is to be understood that the disclosure is also applicable to vanes that are made of metallic alloys.

The vanes 62 are radially supported via the platform 68 at the outer diameter by one or more supports 74. For example, the support or supports 74 may be an engine case or an intermediate structure, such as a spar or carrier, that attaches to an engine case. The vanes 62 may be attached to the support 74 by hooks, flanges, or other features designed for attachment. The vanes 62 are supported at the inner diameter by a tangential onboard injector (TOBI) 76.

In general, a TOBI is a structure in a gas turbine engine at an inner diameter location of the turbine vanes that receives cooling air and redirects the cooling air through nozzles in an axially aft direction to cool downstream components, such as but not limited to, a portion of a turbine disc. Although a TOBI may axially confine a row of turbine vanes, it has not generally been designed to radially support the vanes. However, as new vane designs are developed, especially those that employ ceramic materials, there is a concomitant desire for new approaches to supporting the vanes that is sensitive to the strength and durability characteristics of the ceramic material that the vanes are made of. In this regard, as will be described below, the TOBI 76 disclosed herein is dually configured for redirecting cooling air and for radially supporting the vanes 62.

As shown in FIG. 3, the TOBI 76 includes fore and aft annular walls 78*a*/78*b*, an outer diameter annular wall 80, and an inner diameter annular wall 78*c*. The TOBI may be made from a metallic alloy, such as a nickel- or cobalt-based superalloy. For instance, the TOBI 76 may be cast, additively manufactured, or bonded from prefabricated separate pieces. In the example shown, at least the outer diameter annular wall 80 is initially a separate piece that is then bonded to the fore and aft walls 78*a*/78*b* at weld joints 81. The walls 78*a*/78*b*/78*c*/80 define there between an annular plenum 82. That is, the walls 78*a*/78*b*/78*c*/80 are the bounds of the plenum 82. The TOBI 76 includes a plurality of axially-oriented nozzles 84 for discharging the cooling air flow from the plenum 82 in an aft direction. For instance, the nozzles 84 may include fins, guide vanes, or other structures that facilitate guiding the cooling air flow. Optionally, the TOBI 76 may include an internal rib 83, to add strength and/or facilitate control of the cooling air flow.

The vanes 62 are situated on the outer diameter annular wall 80 such that the TOBI 76 radially supports each of the vanes 62. In this regard, an outer diameter surface 80*a* of the outer diameter annular wall 80 is in full interfacial contact with the inner diameter surface 70*a* of the inner platform 70. That is, the full or substantially full area of the outer diameter surface 80*a* is in contact with the inner diameter surface 70*a*. Such interfacial contact may facilitate distribution of loads and thus mitigation of stresses. If such full contact is undesired, contact pads or bands may be provided on the platform 70, on the outer diameter annular wall 80, or both, to control the locations where the loads are transmitted. Optionally, for axial constraint, the outer diameter annular wall 80 may include a radially-open slot 80*b* and the platforms 70 may include radial tabs 70*b* that are disposed in the radially-open slot 80*b*. The tabs 70*b* interlock with the slot 80*b* and thus limit relative axial movement between the TOBI 76 and the vanes 62.

Figure 4:
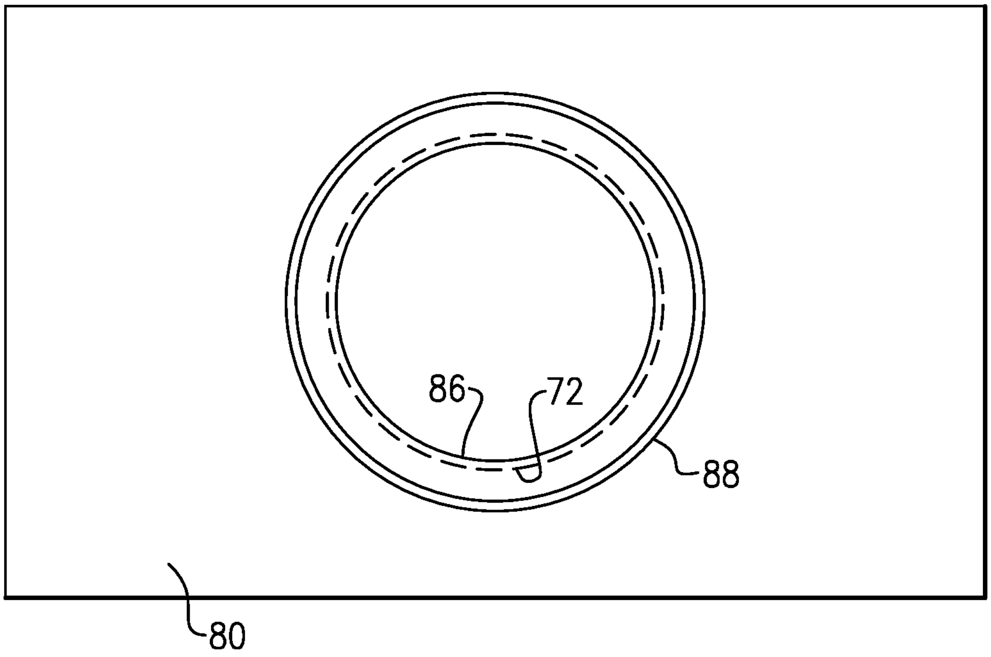
FIG. 4 illustrates the ports of the TOBI and vane.

The outer diameter annular wall 80 includes TOBI inlet ports 86 that are connected, respectively, with the vane outlet ports 72 to receive the cooling air flow from each of the vanes 62 into the plenum 82. For example, FIG. 4 illustrates a radially-outwardly-looking view at the outer diameter annular wall 80. The vane outlet port 72 is superimposed to show its location relative to the TOBI inlet port 86. In this example, the ports 72/86 are circular in cross-section, approximately equal in area, and are radially aligned with each other. Alternatively, the ports 72/86 could have other cross-sectional shapes, such as stadium, oval, or rectangle. As an example, both of the ports 72/86 are stadiums, ovals, or rectangles of approximately equal area that are radially aligned with each other.

The area of the ports 72/86 may be selected to meter the cooling air flow for a desired downstream cooling effect, to provide pressures that reduce leakage, and/or to reduce pressure-driven stresses in the TOBI 76. For a given cross-sectional area, a circular shape provides a minimal perimeter length through which the cooling air can leak (and thus a minimal length over which to seal). Additionally, the interface between the outer diameter annular wall 80 and the platform 70 enables use of a variety of seals to select from for effective sealing in a given implementation. For instance, in the example shown, a seal 88 is provided around the ports 72/86 to seal the interface. For example, the seal 86 may be, but is not limited to, a rope seal or a face seal.

Figure 5:
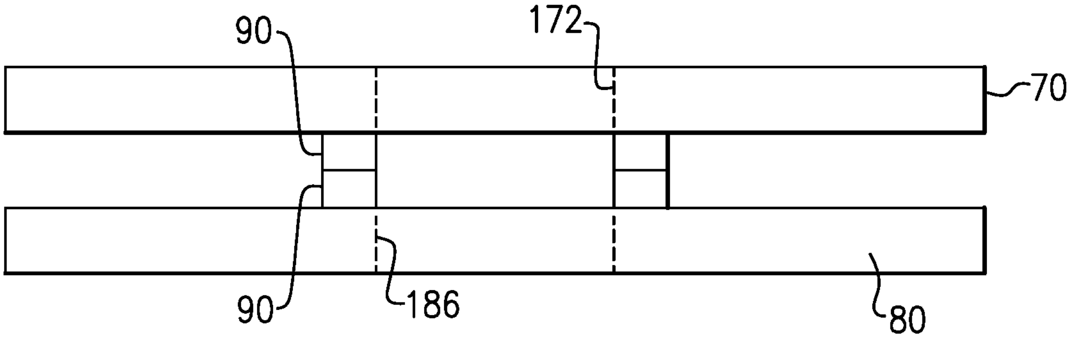
FIG. 5 illustrates an example in which the ports of the TOBI and vane have raised lips.
Figure 6:
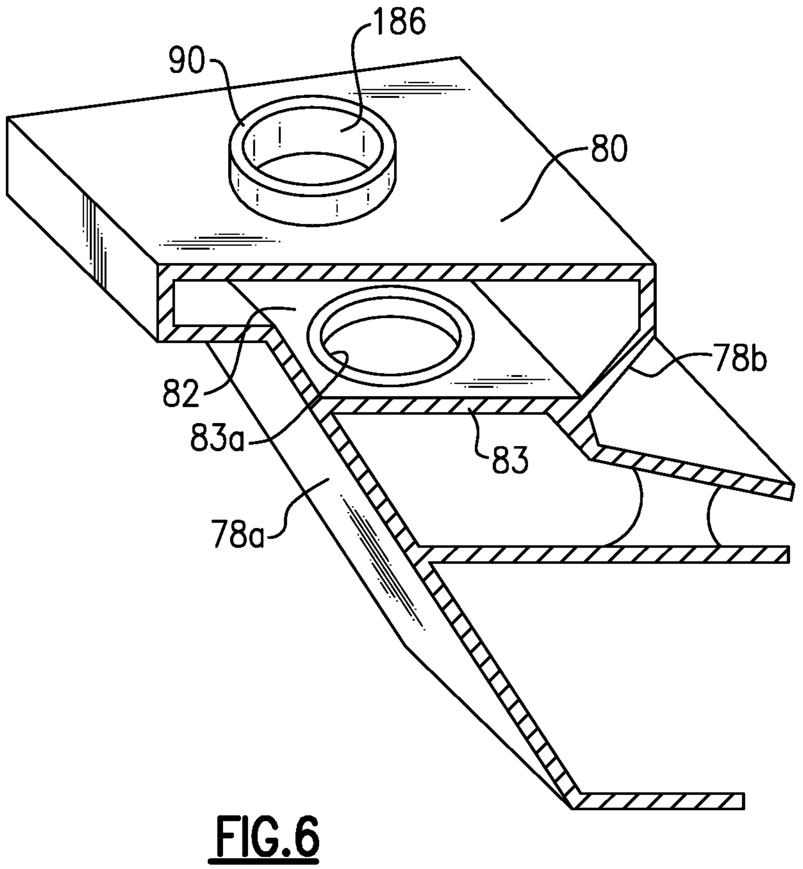
FIG. 6 illustrates the TOBI of FIG. 5 and raised lip.

FIG. 5 illustrates another example in which each of the ports 172/186 include upstanding lips 90. The TOBI 76 and lip 90 of the port 186 is also shown in the sectioned view of FIG. 6. The lip 90 of the port 172 mates against the lip 90 of the port 186. Such a connection spaces the outer diameter annular wall 80 from the platform 70, which may be used to accommodate other, intermediate features or support structures. Moreover, the lips 90 may act as contact pads for the transmission of loads between the vane 62 and the TOBI 76. FIG. 6 also shows the rib 83 with metering orifices 83*a* (one shown) for further controlling the cooling air flow. In this case, the rib 83 serves as an annular inner wall of the plenum 82. The cooling air in the TOBI 76 is thus sealed in the plenum 82 with limited potential pathways for leakage Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:

a circumferential row of vanes arranged about a central engine axis, each of the vanes including an airfoil section that has an internal through-cavity, inner and outer platforms between which the airfoil section extends, and a vane outlet port for conveying cooling air; and a tangential onboard injector (TOBI) radially supporting the vanes at an inner diameter of the circumferential row, the TOBI including fore and aft annular walls and an outer diameter annular wall, the fore and aft annular walls and the outer diameter annular wall defining there between an annular plenum, the outer diameter annular wall including TOBI inlet ports that are connected, respectively, with the vane outlet ports to receive the cooling air from each of the vanes into the plenum, the TOBI including a plurality of axially-oriented nozzles for discharging the cooling air from the plenum in an aft direction, and the outer diameter annular wall of the TOBI has an outer diameter surface that is in full interfacial contact with an inner diameter surface of each of the inner platforms.

2. The gas turbine engine as recited in claim 1, wherein the outer diameter annular wall radially supports the vanes.

3. The gas turbine engine as recited in claim 1, wherein the vane outlet ports are radially aligned with, respectively, the TOBI inlet ports.

4. The gas turbine engine as recited in claim 3, wherein vane outlet ports and the TOBI inlet ports are circular in cross-section.

5. The gas turbine engine as recited in claim 1, wherein the vane outlet ports and the TOBI inlet ports include upstanding lips.

6. The gas turbine engine as recited in claim 1, where the vanes have, respectively, inner diameter platforms, the inner diameter platforms having radial tabs extending therefrom, the outer diameter annular wall of the TOBI includes a radially-open slot, and the radial tabs are disposed in the radially-open slot and limit relative axial movement between the TOBI and the vanes.

7. The gas turbine engine as recited in claim 1, further comprising seals between the vanes and the outer diameter annular wall that seal around the vane outlet ports and the TOBI inlet ports.

8. The gas turbine engine as recited in claim 7, wherein the seals are rope seals.

9. The gas turbine engine as recited in claim 1, wherein the vanes are in a turbine section.

10. The gas turbine engine as recited in claim 1, wherein the outer diameter surface is annular about the central engine axis.

* * * * *